(12) United States Patent
Linhardt

(10) Patent No.: US 8,577,429 B2
(45) Date of Patent: Nov. 5, 2013

(54) MOBILE DEVICE ACCESSORY

(75) Inventor: Michael Linhardt, Forest Park, IL (US)

(73) Assignee: AirEast Mobile, Inc, Forest Park, IL (US)

( * ) Notice: Subject to any disclaimer, the term of this patent is extended or adjusted under 35 U.S.C. 154(b) by 226 days.

(21) Appl. No.: 13/215,408

(22) Filed: Aug. 23, 2011

(65) Prior Publication Data

US 2013/0053113 A1 Feb. 28, 2013

(51) Int. Cl.
*H04M 1/00* (2006.01)

(52) U.S. Cl.
USPC ............ 455/575.8; 455/575.1; 455/90.3; 455/90.1; 455/100

(58) Field of Classification Search
USPC ............ 455/575.1, 90.3, 90.1, 100, 575.8; 379/430, 449
See application file for complete search history.

(56) References Cited

U.S. PATENT DOCUMENTS

| 4,828,153 A * | 5/1989 | Guzik et al. ............... 224/242 |
| 2009/0090750 A1 * | 4/2009 | Alcenat ..................... 224/101 |

* cited by examiner

*Primary Examiner* — Manpreet Matharu

(74) *Attorney, Agent, or Firm* — Beem Patent Law Firm

(57) ABSTRACT

An accessory configured to couple to a mobile device is disclosed. The accessory may include at least one finger engaging portion having an exterior surface and a clip portion adjacent the exterior surface. The clip portion may include a tab and a device engaging portion. The accessory further may include an extension portion extending outward from the exterior surface of the finger engaging portion, wherein the device engaging portion extends between the tab and the extension portion.

19 Claims, 2 Drawing Sheets

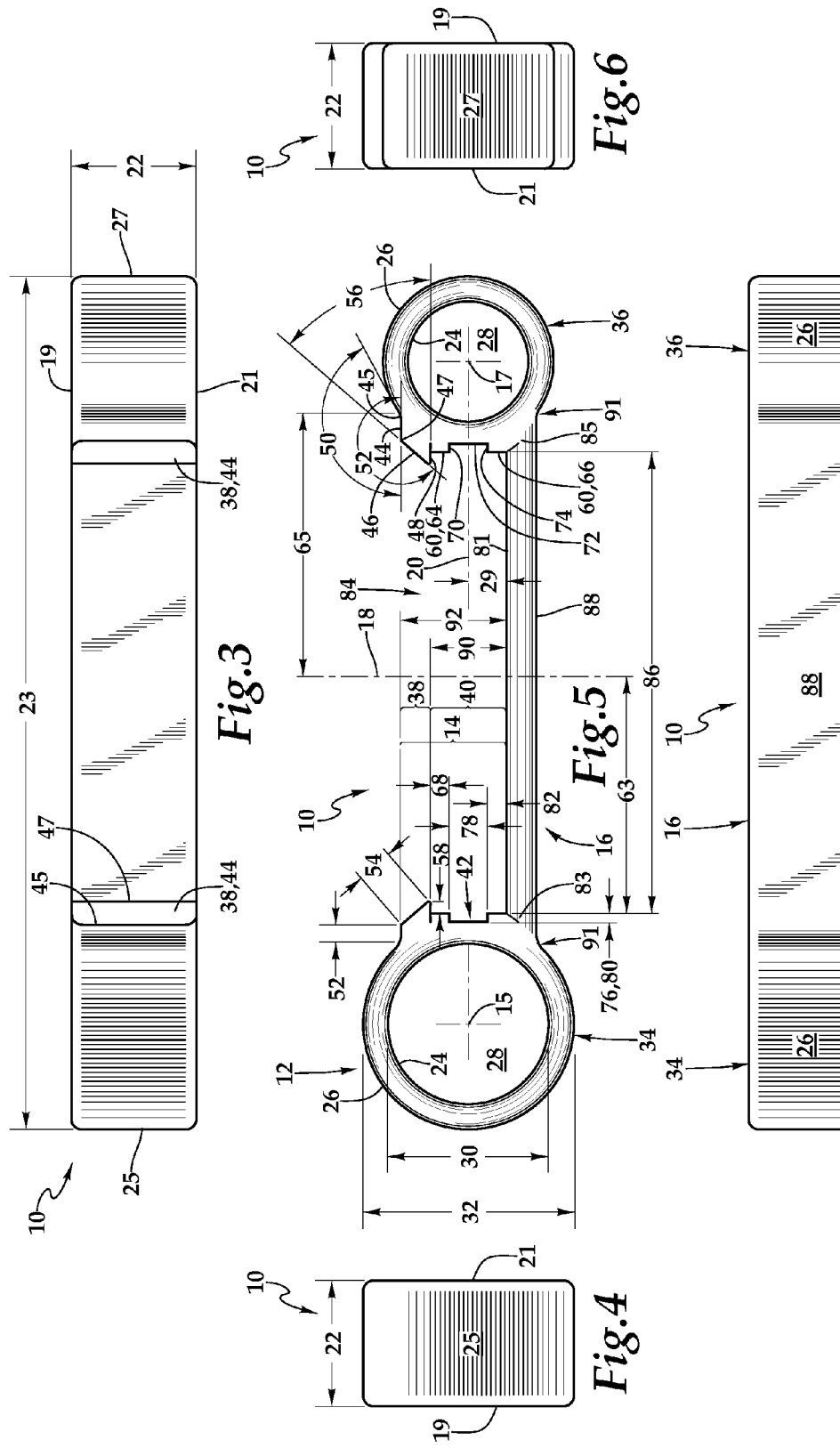

MOBILE DEVICE ACCESSORY

BACKGROUND OF THE INVENTION

1. Field of the Invention

The present invention is directed generally to the field of mobile device accessories.

2. Description of the Related Art

Many mobile devices now have cameras built into the device, and the cameras can capture pictures and/or video. It can be difficult when using a built-in camera to hold the device steady to take a clear picture or video.

Moreover, the position of the camera lens can present difficulties when taking a picture or video. A user may accidentally block the camera lens with his or her fingers while trying to hold the device and take the picture or video and may ruin a picture or video.

Other devices require two hands in order to use the camera. For example, a user may have to hold the device with one hand and may have to operate the camera, i.e., pressing the button or screen to capture the picture or video, with the other hand.

There are devices that may be helpful in taking pictures or video on a mobile device, such as a tripod; however, most tripods are large, bulky, not easy to use or transport, and generally have multiple components, some of which may be small fastening mechanisms, such as screws. Tripods generally cannot fit in your pocket or on your keychain and may be difficult to transport. Additionally, tripods or other such devices may interfere with cellular coverage.

What is needed is an accessory that overcomes these drawbacks.

SUMMARY OF THE INVENTION

In one aspect, an accessory configured to couple to a mobile device is disclosed. The accessory may include at least one finger engaging portion having an exterior surface and a clip portion adjacent the exterior surface. The clip portion may include a tab and a device engaging portion. The accessory further may include an extension portion extending outward from the exterior surface of the finger engaging portion, wherein the device engaging portion extends between the tab and the extension portion.

These and other features and advantages are evident from the following description, with reference to the accompanying drawings.

BRIEF DESCRIPTION OF THE SEVERAL VIEWS OF THE DRAWINGS

FIG. 3 is a top view of the accessory shown in FIG. 1.

FIG. 4 is a left side view of the accessory shown in FIG. 1.

FIG. 5 is a front view of the accessory shown in FIG. 1.

FIG. 6 is a right side view of the accessory shown in FIG. 1.

FIG. 7 is a bottom view of the accessory shown in FIG. 1.

DETAILED DESCRIPTION OF THE INVENTION

Figure 2:
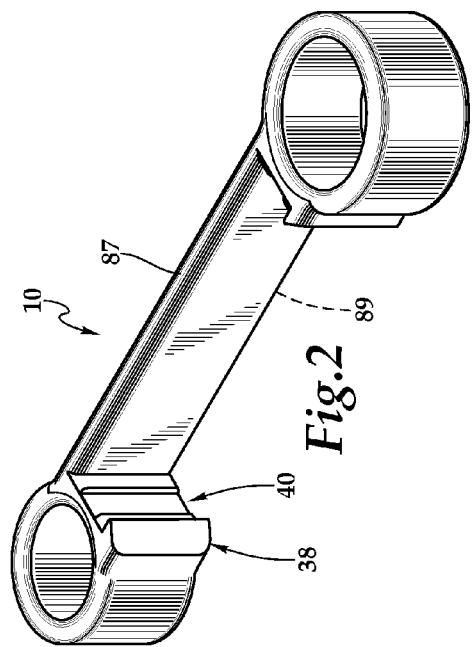
FIG. 2 is another perspective view of the accessory shown in FIG. 1.
Figure 1:
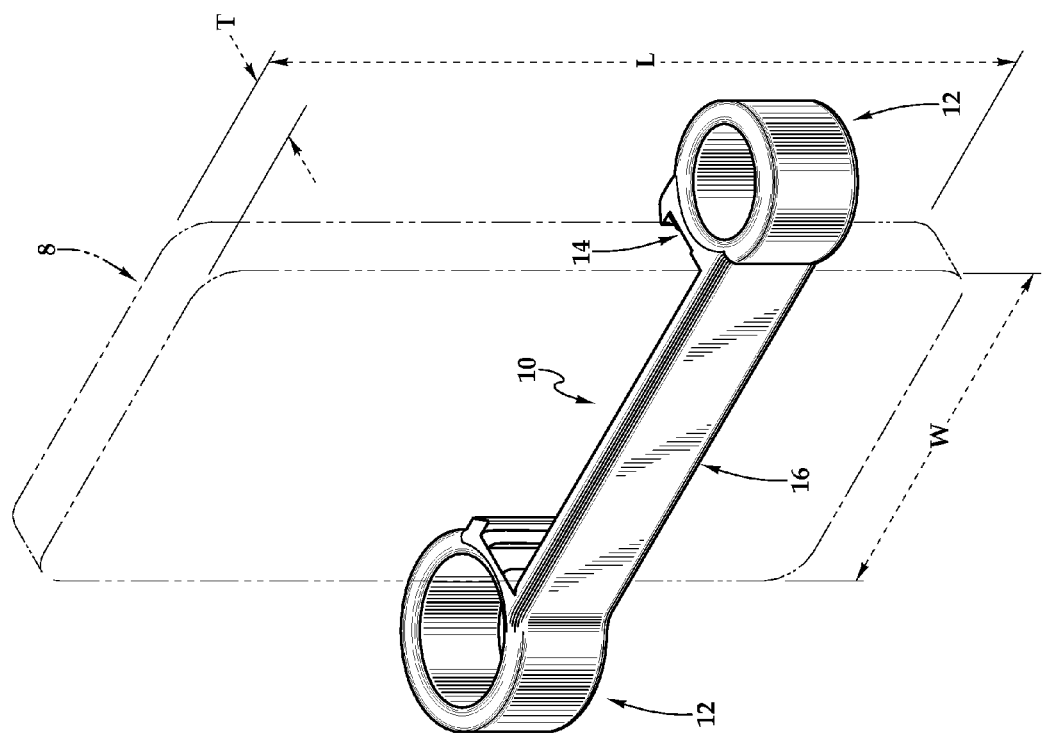
FIG. 1 is a perspective view of one embodiment of a mobile device accessory.

As described herein, an accessory 10 may be configured to couple to and/or engage a mobile device to facilitate use of the mobile device, such as steadying the device to make it easier to view the display and/or record video or take pictures and to prevent user interference with a camera of the mobile device. For example, the mobile device may be an iPhone, a Blackberry, a mobile phone, a tablet or other such device. A device 8 may have a height H, length L and thickness T.

Moreover, accessory 10 may enable a user to use only one hand to operate the camera and/or device, and may prevent a user's hand from interference with the camera of the mobile device. In one embodiment, accessory 10 is sized to fit in a pocket and/or handbag.

Accessory 10

As shown in the FIGS., accessory 10 may include at least one finger engaging portion 12 and a clip portion 14. In one embodiment, accessory 10 further includes an extension portion 16 that extends between a first finger engaging portion and a second finger engaging portion.

Additionally, accessory 10 may have a width 22 between a first side 19 and a second side 21, and a length 23 between a first end 25 and a second end 27. Width 22 may be between about 0.1 inches and about 1.5 inches, preferably between about 0.5 inches and about 1.25 inches, and more preferably about 0.625 inches. In one embodiment, width 22 does not vary along length 23. Length 23 may be between about 1 inches and about 14 inches, preferably between about 3 inches and about 11 inches, and more preferably about 4.25 inches.

Accessory 10 may have a vertical axis 18, as shown in FIG. 5, that is substantially normal to extension portion 16, and a centerline or horizontal axis 20 may extend between center 15 of a first finger engaging portion and a center 17 of a second finger engaging portion. Further, axis 20 may be substantially parallel to and offset a distance 29 from extension portion 16.

Accessory 10 may be fabricated of any durable material, such as plastic, rubber, a polymer (synthetic and/or natural), silicone, neoprene, metal and/or cardboard. In one embodiment, accessory 10 is plastic and is injection molded. Preferably, accessory 10 is fabricated of a resilient material.

Finger Engaging Portion 12

Accessory 10 may include at least one finger engaging portion 12, such that a user's finger may be inserted into portion 12 to facilitate use of accessory 10.

Portion 12 may include an interior surface 24, an exterior surface 26, and an opening 28 within portion 12. Opening 28 may be configured to receive a user's finger therein and may be any suitable shape, such as round, rectangular, trapezoidal, hexagonal or octagonal. For example, as shown in the FIGS., opening 28 is round, and may be any size, preferably sized for a finger to fit therein.

As shown in FIG. 5, when opening 28 is round, interior surface 24 has a first diameter 30. Diameter 30 may be between about 0.2 inches and about 1 inch, preferably between about 0.4 inches and about 0.8 inches. In one embodiment, inner surface 24 is smooth; however, in another embodiment, inner surface 24 may have a plurality of grooves to prevent the user's finger from slipping when accessory 10 is in use.

Exterior surface 26 may be any suitable shape, such as round, rectangular, trapezoidal, hexagonal or octagonal and may be any size. In one embodiment, as shown in the FIGS., surface 26 may be round and may have a second diameter 32. Second diameter 32 may be greater than first diameter 30. Second diameter 32 may be between about 0.5 inches and about 2.5 inches, preferably between about 0.75 inches and about 1.5 inches, and more preferably about 1.05 inches.

Moreover, in one embodiment and as shown in the FIGS., accessory 10 may include two finger engaging portions 12, such as a first engaging portion 34 and a second engaging portion 36. In one embodiment, a device may be coupled between portions 34 and 36, particularly with a friction or interference fit.

Finger engaging portions 34 and 36 may have any size. Preferably, portions 34 and 36 are different sizes to accommodate fingers of different sizes. For example, a user may insert their thumb into portion 34 and their middle finger on the same hand into portion 36; in such an embodiment, portion 34 is larger than portion 36. In one embodiment, portion 34 may be about 30% larger than portion 36, such that diameter 30 of portion 34 may be about 30% greater than diameter 30 of portion 36. Diameter 30 of portion 34 may be between about 0.2 inches and about 1 inch, preferably between about 0.4 inches and about 0.8 inches, and more preferably about 0.75 inches, and diameter 30 of portion 36 may be between about 0.2 inches and about 1 inch, preferably between about 0.4 inches and about 0.8 inches, and more preferably about 0.5 inches.

In another embodiment, portions 34 and 36 are substantially the same size such that inner diameters 30 of portions 34 and 36 are substantially the same. In this embodiment, accessory 10 is substantially symmetrical about axis 20.

Clip Portion 14

Accessory 10 further may include at least one clip portion 14 configured to engage a device. Clip portion 14 may be proximate, formed within, adjacent to or coupled to at least one finger engaging portion 34, 36. For example, clip portion 14 may be coupled to surface 26.

Preferably, clip portion 14 engages the sides of the device via a friction or interference fit. A friction fit enables clip portion 14 to engage device 10 and stay in place during use, but enables a user to move or slide clip portion 14 along the device 10 with little difficulty when a user wants to move or remove clip portion 14 from the device. Alternatively, clip portion 14 may engage the device with a different fit or with a fastening mechanism.

Clip portion 14 may include at least one tab or retaining portion 38. Clip portion 14 further may include at least one device engaging portion 40. In one embodiment, portions 38 and 40 are configured to facilitate engaging the device. Clip portion 14 further may include a groove or channel 42 formed within device engaging surface 40. Groove 42 may facilitate moving and/or sliding clip portion 14 along the device.

As shown in the FIGS., particularly in FIG. 5, portion 38 may include a plurality of surfaces, such as a first extension surface 44, an inclined or chamfered surface 46, and a second extension surface 48. In one embodiment, each of the plurality of surfaces 44, 46, 48 is substantially planar. Alternatively, each of the plurality of surfaces 44, 46, 48 may be curved. Moreover, surfaces 44, 46, 48 may extend between sides 19 and 21, such that the width of surfaces 44, 46, 48 may be substantially the same as width 22.

First extension surface 44 may have a first end 45 and a second end 47. In one embodiment, surface 44 may extend outward from exterior surface 26 of finger engaging portion 12 via an angle 50. For example, as shown in FIG. 5, angle 50 may be an obtuse angle between about 91 degrees and about 175 degrees, preferably between about 110 degrees and about 150 degrees, and more preferably between about 125 degrees. Extension surface 44 may have a length 52, wherein length 52 may be between about 0.5 inches and about 1 inches, and preferably about 0.5 inches. Alternatively, extension surface 44 may extend outward from exterior surface 26 via a radius of curvature.

Inclined surface 46 may extend outward and downward from surface 44 via an angle 52. Angle 52 may be between about 185 degrees and about 270 degrees, preferably between about 200 degrees and about 250 degrees, and more preferably between about 225 degrees. Surface 46 may have a length 54 that may be between about 0.125 inches and about 0.375 inches, and preferably about 0.125 inches.

Second extension surface 48 may extend inward from surface 46 at an angle 56. Angle 56 may be an acute angle, such that angle 56 may be between about 20 degrees and about 80 degrees, preferably between about 30 degrees and about 60 degrees, and more preferably about 45 degrees. Surface 48 may have a length 58 that may be between about 0.187 inches and about 0.25 inches, and preferably about 0.187 inches. In one embodiment, surfaces 44 and 48 are substantially parallel, and length 58 is less than length 52.

Device engaging portion 40 may be proximate to finger engaging portion 12. Further, portion 40 may be proximate or adjacent to portion 38, such that portion 40 may extend downward from portion 38. In one embodiment, portion 40 extends downward and may be substantially normal to surface 48.

Portion 40 may include at least one surface 60. Surface 60 may be configured to abut or contact the device when clip portion 40 is coupled to the device. Surface 60 may be substantially planar. Surface 60 may be offset a distance 63 from axis 18, and first end 45 of surface 44 may be offset a distance 65 from axis 18. In one embodiment, distance 63 is less than distance 65. Alternatively, surface 60 may be curved and may include a plurality of teeth.

Surface 60 may be separated by groove 42, such that surface 60 may include at least two surfaces 64 and 66 that may be substantially parallel to one another. In one embodiment, surface 64 may be substantially planar and extends downward from and may be substantially normal to surface 60. Surface 64 may have a length 68 that may be between about 0.0625 inches and about 0.0787 inches, and preferably about 0.0625 inches.

Further, in one embodiment, surface 66 may be substantially planar. Also, surface 66 may extend downward from and may be substantially normal to a surface, such as surface 74. Surface 66 may have a length 82 that may be between about 0.0625 inches and about 0.0787 inches, and preferably about 0.0625 inches.

Groove 42 may include a plurality of surfaces, such as surfaces 70, 72 and 74. In one embodiment, surface 70 may be substantially planar and extends inward from and may be substantially normal to surface 64. Surface 70 may have a length 76 that may be between about 0.023 inches and about 0.031 inches, and preferably about 0.023 inches. Further, in one embodiment, surface 72 may be substantially planar. Further, surface 72 may extend downward from and may be substantially normal to surface 70. Surface 72 may have a length 78 that is between about 0.243 inches and about 0.276 inches, and preferably about 0.243 inches. In one embodiment, surface 74 may be substantially planar. Further, surface 74 may extend outward from and may be normal to surface 72. Surface 74 may have a length 80 that may be between about 0.024 inches and about 0.031 inches, and preferably about 0.024 inches. In one embodiment, lengths 76 and 80 preferably are substantially the same length, and are less than length 58.

In one embodiment, surfaces 70, 72, 74 form a substantially rectangular groove. In an alternative embodiment, groove 42 may include a single surface. For example, groove 42 may be curved having a radius of curvature. In yet another alternative embodiment, groove 42 may have peaks and valleys.

In one embodiment, when clip portion 14 is coupled to the device, groove 42 is configured to provide an offset or indentation from the device to provide ease in moving or sliding or coupling clip portion 14 along the device. Moreover, groove 42 may be indented with respect to surface 60 and with respect to retaining portion 38, so that retaining portion 38 acts as an overhang to facilitate retaining the device in a friction or interference fit with accessory 10.

Additionally, in one embodiment, clip portion 14 may have a height 90 defined between surface 44 and a surface 81 of portion 16. Height 90 may be between about 0.367 inches and about 0.393 inches, and preferably about 0.367 inches.

Moreover, in one embodiment, device engaging portion 40 may have a height 92 defined between surface 48 and surface 16. Height 92 may be between about 0.1 inches and about 1 inch, preferably between about 0.2 inches and about 0.75 inch, and more preferably about 0.375 inches. Preferably, height 92 is less than height 90. Additionally, height 92 may be about the same size as the thickness of the device.

In one embodiment, as shown in FIG. 5, accessory 10 may include two clip portions 14, wherein each clip portion 14 may be a mirror image of the other about axis 18. The clip portions may face one another. In an alternative embodiment, a first clip portion 14 may be sized and shaped differently from a second clip portion 14. This may be useful when the device is not symmetrical or has sides with varying or different depths, widths and lengths.

Extension Portion 16

Accessory 10 further may include extension portion 16. Once accessory 10 and the device are coupled together, portion 10 is configured to prevent accessory 10 from falling off of the device and extension portion 16 may extend along the width or length of the device, such as along the back of the device.

Extension portion 16 may separate finger engaging portions 12 and also may separate clip portions 14. A channel 84 may be formed by clip portions 14 and extension portion 16.

As shown in FIG. 5, in one embodiment, extension portion 16 may extend outward from an exterior surface 26 of finger engaging portion 12.

Further, extension portion 16 may have a first end 83 proximate finger engaging portion 34 and a second end 85 proximate finger engaging portion 36. Extension portion 16 further may have a first surface 81 and an opposing second surface 88. Surfaces 81 and 88 may be substantially planar, such that they may be substantially parallel to and offset a distance 29 from axis 20, and may be substantially parallel to at least one surface 44, 48, 70, 74. Alternatively, surfaces 81 and 88 may have a radius of curvature.

Additionally, surface 88 may include at least one chamfer. In one embodiment, surface 81 includes two substantially parallel chamfers 87 and 89 that may extend along sides 19 and 21, respectively, between clip portions 14.

Moreover, surface 88 may include indicia, such as a company name or product name.

Surface 81 of extension portion 16 may extend outward from and may be substantially normal to surface 74. Surface 88 of extension portion 16 may extend outward from surface 26 of finger engaging portion 12 via a radius of curvature 91.

Portion 16 may have a length 86 that may be between about 0.5 inches and about 12 inches, preferably between about 1.25 inches and about 6 inches, and more preferably about 2.3 inches. Preferably, length 86 of portion 16 is about the width or length of the device to facilitate coupling accessory 10 to the device with a friction or interference fit. Also, length 86 may be about at least four times as long as height 90 of clip portion 14.

In one embodiment, portion 16 may be adjustable along its length 86 to move portion between 16 between longer and shorter lengths. For example, portion 16 may telescope.

Additional Features

In one embodiment, accessory 10 may include a belt clip. For example, the belt clip may be coupled to and extend from at least one surface of extension portion 16. Preferably, the belt clip may extend from surface 88.

In another embodiment, accessory 10 may include a flange to facilitate coupling accessory 10 to a key chain.

Use

During use, accessory 10 preferably is slid onto the device, such that the device couples to and/or engages clip portion 14. Particularly, device may abut at least one surface of portion 40, and device may be retained by portion 38.

In one embodiment, when accessory 10 includes one finger engaging portion 12 and at least one clip portion 14, the device may remain coupled to the accessory 10 with portion 38. In another embodiment, when accessory 10 include at least two finger engaging portions 12, the device is slid into channel 84 between the finger engaging portions and may be remain coupled to accessory 10 with the finger engaging portions.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. An accessory configured to couple to a mobile device, the accessory comprising:
    at least one finger engaging portion having an exterior surface and an opening configured to receive a user's finger;
    a clip portion adjacent the exterior surface, wherein the clip portion has:
        a tab, and
        a device engaging portion; and
    an extension portion extending outward from the exterior surface of the finger engaging portion,
    wherein the device engaging portion extends between the tab and the extension portion; and
    wherein the device engaging portion includes a pair of substantially parallel surfaces with an indentation forming a groove disposed therebetween.

2. An accessory according to claim 1, wherein the clip portion is substantially normal to the extension portion.

3. An accessory according to claim 1, wherein the finger engaging portion is a first finger engaging portion, and wherein the accessory further comprises a second finger engaging portion having an exterior surface.

4. An accessory according to claim 3, wherein the first finger engaging portion has a first outer diameter and the second finger engaging portion has a second outer diameter, wherein the first outer diameter is greater than the second outer diameter.

5. An accessory according to claim 3, further comprising a second clip portion, wherein the second clip portion is adjacent the exterior surface of the second finger engaging portion.

6. An accessory according to claim 3, wherein the extension portion extends between the first and second finger engaging portions.

7. An accessory according to claim 3, wherein the extension portion is substantially parallel to and offset set from a centerline extending between a center of the first finger engaging portion and a center the second finger engaging portion.

8. An accessory according to claim 1, wherein the mobile device has a width and the extension portion has a length, wherein the length is configured to be substantially the same as the width of the mobile device to facilitate a friction fit between the accessory and the mobile device.

9. An accessory according to claim 1, wherein the extension portion has at least one chamfer.

10. An accessory according to claim 1, wherein the accessory is fabricated of a resilient material.

11. An accessory according to claim 1, wherein the device engaging portion has a height, wherein the height is about the thickness of the mobile device.

12. An accessory according to claim 1, wherein at least one finger engaging portion has an opening configured to receive a finger therein.

13. An accessory according to claim 12, wherein the opening has an interior surface, wherein the interior surface includes a plurality of grooves.

14. An accessory according to claim 1, further comprising a belt clip coupled to the extension portion.

15. An accessory according to claim 1, wherein the tab has at least three surfaces including a first surface that extends outward from the exterior surface of the finger engaging portion via an angle, an inclined surface that extends outward from the first surface via an angle, and a second surface that extends inward from the inclined surface via an angle.

16. An accessory according to claim 1, wherein the substantially planar surfaces extend inward of the tab.

17. An accessory according to claim 1, wherein the device engaging portion has at least one surface that is substantially normal to at least one of the tab and the extension portion.

18. An accessory configured to couple to a mobile device, the accessory comprising:
   at least one finger engaging portion having an exterior surface;
   a clip portion adjacent the exterior surface, wherein the clip portion has:
      a tab, and
      a device engaging portion; and
   an extension portion extending outward from the exterior surface of the finger engaging portion,
   wherein the device engaging portion extends between the tab and the extension portion;
   wherein the tab has at least three surfaces including a first surface that extends outward from the exterior surface of the finger engaging portion via an angle, an inclined surface that extends outward from the first surface via an angle, and a second surface that extends inward from the inclined surface via an angle.

19. An accessory configured to couple to a mobile device, the accessory comprising:
   a pair of finger engaging portions, each finger engaging portion having an exterior surface and an opening configured to receive a user's finger;
   a pair of clip portions disposed proximate the finger engaging portions, wherein each clip portion has:
      a tab, and
      a device engaging portion; and
   an extension portion extending between the device engaging portions,
   wherein the clip portions are mirror images of one another;
   wherein each device engaging portion extends between the extension portion and a respective tab; and
   wherein at least one of the device engaging portions includes a pair of substantially parallel surfaces with an indentation defining a groove disposed therebetween.

* * * * *